May 16, 1961 H. G. FAY 2,983,958
MANDREL FOR HOLDING INSERT DURING INJECTION MOLDING
Filed June 14, 1949 2 Sheets-Sheet 1
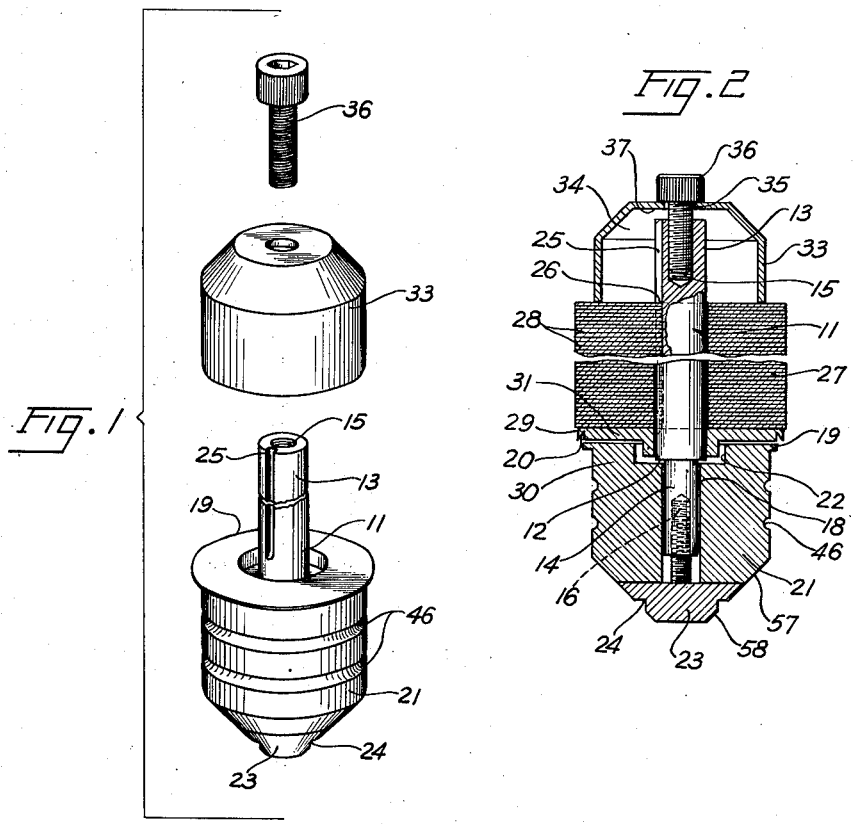
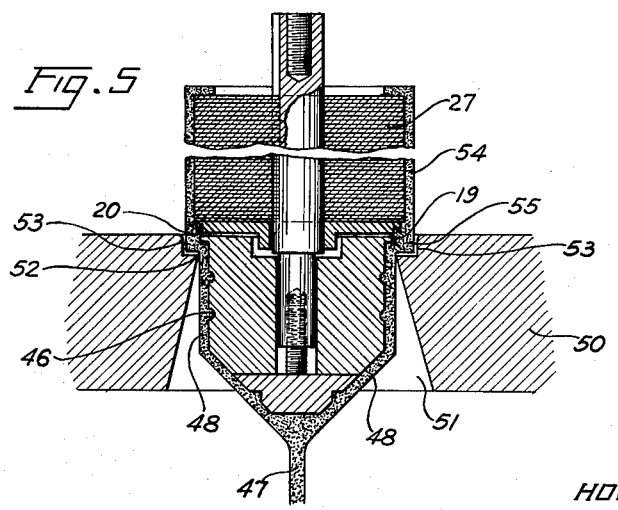
HOWARD G. FAY
INVENTOR
BY
ATTORNEYS

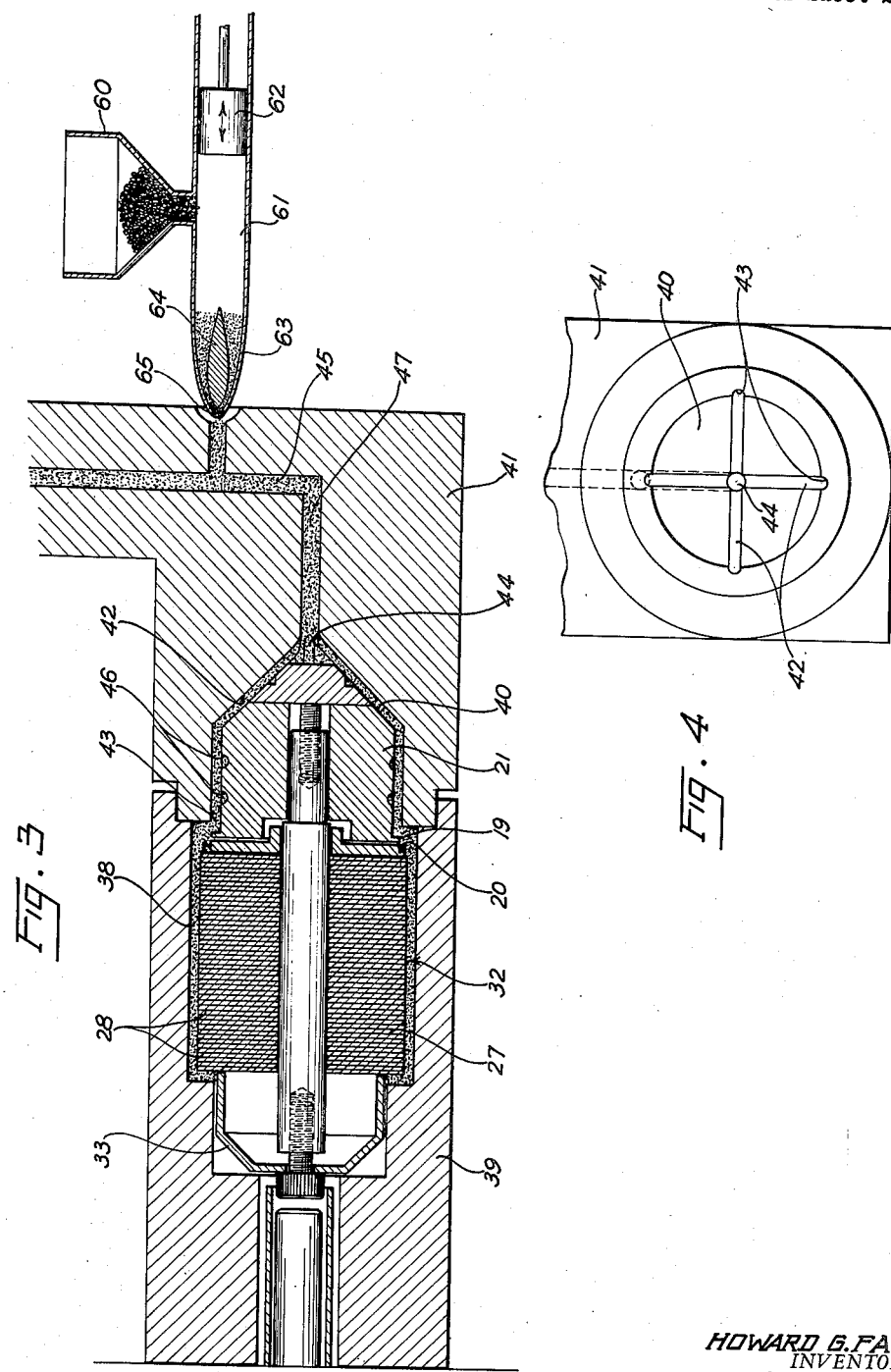

United States Patent Office 2,983,958
Patented May 16, 1961

2,983,958
MANDREL FOR HOLDING INSERT DURING INJECTION MOLDING

Howard G. Fay, Rochester, N.Y., assignor, by mesne assignments, to the United States of America as represented by the Secretary of the Navy Filed June 14, 1949, Ser. No. 98,921

2 Claims. (Cl. 18—36)

This invention relates to molding small articles and particularly to the manufacture of small, high voltage batteries consisting of a stack of alternate battery plates and insulators with a plastic cover or jacket, and more particularly to apparatus for removing the gate and sprue remaining on the plastic-jacketed battery after it has been ejected from the cavity of a molding machine.

In injection molding, the mold entrance or feed opening is commonly called the sprue. In multiple-cavity injection molds the sprue may be a channel through the stationary part of the mold which connects directly with the injection cylinder nozzle. The large end of the sprue feeds the runners, which are the channels leading from the sprue to the individual cavities. In a single-cavity mold the sprue usually leads directly to the cavity and there is no runner. The restricted portion of the runner at the point where it joins the cavity is commonly referred to as the gate. The words "sprue" and "gate" also connote the scrap molding material formed in the corresponding openings of the mold and attached to the molded article after the molding operation is complete and the article has been ejected from the mold.

Only a limited number of shapes are adaptable to the use of a mold having a so-called stripper plate to remove the gates before the molded article has been ejected from the mold and while the material is still warm and slightly plastic and the danger of tearing the piece during the trimming operation is at a minimum. Although the removal of the sprue on most injection molded articles can be performed by hand in the case of a single cavity mold, when several articles are shaped simultaneously in a multiple-cavity mold on a rapid cycle an operator can seldom trim as fast as the machine operates.

Shearing of the gates and sprue by hand is difficult to perform when a jacket of insulation is molded around a stack of apertured members assembled in aligned relation on a mandrel. If, for example, it is desired to form a jacket of plastic material around a battery consisting of an orderly pile of battery plates and insulators, the plates and insulators must first be assembled on a mandrel to hold them in aligned relation. The mandrel is then centrally positioned in a cavity in the moving half of the mold. To prevent distortion or displacement of the stack due to stresses caused by the flow of molding material it is desirable to provide gating in the center or at equally spaced intervals along the circumference at the upper end of the cavity in the stationary half of the mold as described in my co-filed application Serial Number 98,922, now Patent No. 2,763,032. If this method of gating is utilized the excess material attached to the molded article will surround the head of the mandrel. To remove the gates and sprue cleanly without danger of tearing into the molded article special trimming fixtures must be provided.

It is an object of the invention to provide improved apparatus to remove the gates and sprue cleanly from such a molded article in a minimum of time and without danger of tearing into the article.

It is a further object of this invention to provide a mandrel on which a stack of apertured members can be held in aligned relation during an injection molding operation and which itself acts as the male portion of a shearing die to permit trimming of the gates and sprue remaining on the molded article.

Other objects and advantages of the invention will become apparent from an examination of the drawings and accompanying description wherein a preferred form of the invention is shown and described.

In the drawings:

Fig. 1 is a view in perspective of one embodiment of the mandrel according to the invention.

Fig. 2 is a vertical sectional view through an injection mold insert consisting of a stack of apertured members assembled in aligned relation on the mandrel illustrated in Fig. 1.

Fig. 3 is a vertical sectional view through a single cavity of a multiple-cavity injection mold in which the insert illustrated in Fig. 2 is positioned.

Fig. 4 is a left end view of the stationary half of the mold illustrated in Fig. 3.

Fig. 5 is a vertical sectional view through a shearing die in which an article molded in the cavity shown in Fig. 3 is positioned to remove the gate and sprue.

The figures will all be described together since they illustrate the same form of the invention in successive stages of the molding cycle. Fig. 1 is the mandrel alone; Fig. 2 shows it loaded with plates; Fig. 3 shows the loaded mandrel during the molding operation and Fig. 5 shows it after molding.

In the drawings, the mandrel includes an arbor 11 having two cylindrical sections 13 and 14 of different diameter. A shoulder 12 (best seen in Fig. 2) is formed at the junction between the larger diameter cylindrical core 13 and the smaller diameter cylindrical shank 14. Tapped holes 15 and 16 are provided in the ends of the core 13 and the shank 14 respectively.

A cylindrical spreading head 21 having at its upper edge an outwardly extending sharp rim 19 is provided with a clearance hole 18 large enough to receive the shank 14 but small enough to prevent entry of the core 13. The clearance hole 18 is counterbored at the upper end of the spreading head 21 to provide a cylindrical compartment 22 of larger diameter than the core 13. A spreading head screw 23 is threaded to fit the tapped hole 16 in the shank 14 and flat surfaces 24 are milled in the head thereof to facilitate turning. When the spreading head 21 is assembled on the arbor 11 with the shank 14 extending into the clearance hole 18 and with the shoulder 12 abutting against the bottom of the compartment 22, and the spreading head screw 23 is tightened firmly in the tapped hole 16, the spreading head 21 is fixedly positioned on the shank 14 to provide a clamping member on the smaller diameter end of the mandrel. Grooves 46 are cut around the exterior periphery of the spreading head 21 to provide a sprue lock to pull the sprue from the stationary mold section. The spreading head 21 and the spreading head nut 23 are formed with conical surfaces 57 and 58 respectively to aid in distributing the molding material radially to the outside of the mold.

The apertured members are assembled, and conveniently maintained, in desired orientation by a splineway 25 cut along the exterior periphery of the core 13 parallel to the axis of the mandrel and the apertured members are punched with a spline or rib 26 along the inner diameter of the same to operate in the splineway 25. In the process of building up a battery stack 27 any desired number of apertured members can be mounted in proper orientation on the core 13 with the spline 26 of the members 28 operating in the splineway 25.

As described in a co-filed application Serial Number 98,923 by David L. Babcock, it is convenient to form the bottom member 29 of the stack 27 with a sleeve 30 of smaller outer diameter than the diameter of the compartment 22 and having at the upper edge thereof an outwardly extending flange 31. After the molded stack has been ejected from the cavity, the plastic solidified in an undercut 20 provided in the flange 31 will form a leak-proof seal between the jacket of plastic and the bottom member 29.

A thimble-shaped cap 33 of smaller outer diameter than the apertured members 28 and having a cylindrical compartment 34 of larger diameter than the core 13 is disposed adjacent the top of the stack 27 with the core 13 extending into the compartment 34. A clearance hole 35 of smaller diameter than the core 13, but of sufficient size to allow insertion of a cap screw 36, is drilled in the cap 33. The cap screw 36 is threaded to fit in the tapped hole 15 in the end of the core 13. The cylindrical compartment 34 is of sufficient depth so that the end of the core 13 does not touch the top 37 of the compartment 34 when the cap screw 36 is tightened sufficiently in the tapped hole 15 to clamp the stack 27 firmly between the spreading head 21 and the cap 33.

As described in my above-mentioned co-filed application, distortion or displacement of an insert in an injection molding operation can be minimized if the mold is designed with the gate in co-axial relation with the insert as illustrated in Fig. 3. A multiple-cavity injection molding machine is conventionally shown including a gravity feed hopper 60 which proportions the amount of granules of thermoplastic into the feed chamber 61. A reciprocating injection ram 62 then compresses the thermoplastic and forces it through a heating cylinder 63 where it is spread out thinly by a torpedo 64 set in the course of the material. The torpedo 64 assures uniform heating of the thermoplastic. In forcing the thermoplastic into the heating cylinder 63 the injection ram 62 pushes a like amount of material in thoroughly softened form out of the heating cylinder nozzle 65 which abuts against the stationary mold section 41. An insert 32 consisting of the above mentioned stack of apertured members assembled on a mandrel is shown centrally positioned in a single cavity of the multiple-cavity mold. Close fits between the cap 33 and the jacket-shaping cavity 38 in the movable mold section 39 and between the spreading head 21 and the compartment 40 in the stationary mold section 41 retain the insert 32 in position. As illustrated in the left end view (Fig. 4) of the stationary mold section 41, four runners 42 with corresponding gates 43 have been cut at equally spaced intervals around the circumference of the cylindrical compartment 40 in the stationary mold section 41.

To simplify the understanding of the operation of the invention the word "gate" will be used hereinafter in the specification and in the appended claims to mean the cavity nozzle or orifice 44 leading from the runner 45 into the cylindrical compartment 40. The word "sprue" will be hereinafter used in the specification and in the appended claims to mean the excess molding material surrounding the spreading head 21 as well as the slug of material 47 that has solidified in the gate 44. Thus the sprue will include the plastic that has set in the grooves 46 as well as the four fingers 48 of molding material that have solidified in the runners 42. If clearance were provided between the spreading head 21 and the compartment 40 and only a close fit between the cap 33 and the jacket-shaping cavity 38 were utilized to retain the insert 32 in position, the molding material would flow all around the insert 32 and the sprue would include a tubular section completely surrounding the spreading head 21.

To facilitate shearing of the sprue in a minimum of time and without danger of tearing into the molded article, the spreading head 21 is formed with a sharp rim 19 of smaller diameter than the undercut 20 but whose diameter is at least as great as that of a circle circumscribing the four runners 42 at the deepest portion thereof. As illustrated in Fig. 5, a female die 50 matching the sharp rim 19 is provided with a frustro-conical aperture 51. An annular shearing edge 52, whose diameter is substantially equivalent to the diameter of the sharp rim 19, is formed along the upper edge of the frustro-conical aperture 51. After the cap screw 36 has been unscrewed from the shank 13 and the cap 33 has been removed from the mandrel, the plastic-jacketed insert is positioned vertically in the female die 50 with the sprue extending into the aperture 51 and pressure is applied against the core 13. The pressure is transmitted at the shoulder 12 to the spreading head 21, and the sharp rim 19 and the shearing edge 52 cooperate to act as a punch and die to shear the sprue from the jacketed insert. The female die 50 is formed with a shoulder 53 extending upward from the level of the shearing edge 51. The diameter of the female die at the shoulder 53 is substantially equivalent to the outer diameter of the jacket of plastic material 54 molded around the stack 27. When pressure is applied against the core 13 to shear the sprue, the shoulder 53 prevents spreading of the end 55 of the plastic jacket 54 in an outward direction.

While the embodiment of the present invention as herein described constitutes a preferred form, it is to be understood that other forms might be adopted all coming within the scope of the claims which follow.

What I claim is as follows:

1. A mandrel adapted first to hold an apertured insert in an end-gated mold cavity having a compartment adjacent the gate and second to act as the male portion of a shearing die to trim the sprue remaining on the insert after a plastic jacket has been molded thereon, comprising a core for extending through the aperture in the insert and clamping members on each end of the core for clamping the insert, said core being adapted to fit lengthwise in the cavity, the clamping member at the end next to the gate during molding having a main portion smaller in diameter than said compartment with a conical surface facing the gate to distribute the plastic to the outside of the cavity, said clamping member also having a sharp rim next to the insert with the rim diameter a least as great as that of said compartment.

2. Molding apparatus to provide eaesy removal of the sprue remaining on an apertured insert after plastic jacketing of the insert, comprising an end-gated mold cavity complementary in shape to the insert and having a compartment adjacent to the gate and a mandrel adapted to fit lengthwise in the cavity and comprising a core for extending through the aperture in the insert and clamping members on each end of the core for clamping the insert, said compartment being formed with a plurality of grooves cut longitudinally in the walls thereof, the clamping member at the end of the core next to the gate during molding having a main portion fitting snugly in said compartment with a conical surface facing the gate to distribute the plastic to the outside of the cavity through said longitudinal grooves, said clamping member also having a sharp rim next to the insert with the rim diameter at least as great as that of a circle circumscribing the longitudinal grooves at the deepest portion thereof.

References Cited in the file of this patent

UNITED STATES PATENTS

| 2,018,480 | Apple | Oct. 22, 1935 |
| 2,058,938 | Apple | Oct. 27, 1936 |
| 2,079,393 | Benge | May 4, 1937 |
| 2,217,661 | Anderson | Oct. 15, 1940 |
| 2,440,144 | Hosking | Apr. 20, 1948 |